United States Patent [19]
Kitai

[11] 3,829,877
[45] Aug. 13, 1974

[54] CAMERA ELECTRIC SHUTTER WITH MECHANICAL DELAY DEVICE

[75] Inventor: Kiyoshi Kitai, Tokyo, Japan

[73] Assignee: Seiko Koki Kabushiki Kaisha, Tokyo, Japan

[22] Filed: Dec. 21, 1972

[21] Appl. No.: 317,709

Related U.S. Application Data

[63] Continuation of Ser. No. 97,512, Dec. 14, 1970, abandoned.

[30] Foreign Application Priority Data
Dec. 16, 1969   Japan.............................. 44-100815

[52] U.S. Cl............................. 354/246, 95/10 C
[51] Int. Cl. ............................................ G03b 9/00
[58] Field of Search .......... 95/10 C, 10 CE, 10 CT, 95/10 CD, 53 R, 53 E, 53 EA, 53 EB, 55

[56] References Cited
UNITED STATES PATENTS

| | | | |
|---|---|---|---|
| 3,082,673 | 3/1963 | Takahama | 95/55 |
| 3,434,403 | 3/1969 | Biedermann | 95/53 EB |
| 3,479,935 | 11/1969 | Harvey | 95/53 X |

*Primary Examiner*—Monroe H. Hayes
*Attorney, Agent, or Firm*—Robert E. Burns; Emmanuel J. Lobato; Bruce L. Adams

[57] ABSTRACT

An electric shutter in which an electrical circuit normally controls the automatic closing of the shutter lens aperture. A mechanical device in the shutter co-active with the electrical circuit closes the shutter lens aperture mechanically, automatically when the electrical circuit is deenergized or insufficiently energized because of an exhausted power source or because of other reasons.

2 Claims, 10 Drawing Figures

CAMERA ELECTRIC SHUTTER WITH MECHANICAL DELAY DEVICE

This is a continuation of application Ser. No. 97,512, filed Dec. 14, 1970 now abandoned.

BACKGROUND OF THE INVENTION

The present invention relates generally to cameras and more particularly to an electric shutter with a mechanical delay device.

DESCRIPTION OF PRIOR ART

Electric camera shutters are constructed such that if the electrical circuitry is deenergized because of a defect or in the event that the battery or power source is weak or is incapable of energizing the shutter photographs or exposures cannot be properly taken. Provision is made in cameras using electric shutters for having some means indicate that the power source or battery is weak in order that film may not be inadvertently exposed when the shutter cannot function properly. However, these shutters do not make provision for functioning mechanically or making it possible to take good photographs in the event that the electrical shutter energization is insufficient to properly operate the mechanisms for taking an exposure or photograph or if the operator does not notice the indication that the battery is exhausted and should be replaced.

SUMMARY OF THE INVENTION

The general purpose of the invention is to provide an electric camera shutter that eliminates the drawbacks of the known camera shutters.

An object of the present invention is to provide a simple mechanical delay device usable coactively with the electrical circuit of the electric shutter for controlling the end of a delay period, in the absence of electrical control, thereby to control the termination of an exposure.

Another object is to provide an electric control circuit for use in a camera shutter that can take proper photographs regardless of the electrical condition of the circuit or a power source connected therein.

The electrical shutter is provided with a single or a plurality of sector means or plates operable to a position opening the exposure or lens aperture and a position closing the exposure or lens aperture. The sectors or plates are operated by operating means to the position opening the lens aperture and closing it. A control circuit controls the operating means and its operation of the sector means to open the exposure or lens aperture. The control circuit includes electrical means to control the delay period which determines the closing of the shutter lens aperture and therefore the termination of an exposure. The delay period is electrically controlled by deenergizing an electromagnet. In the event that the electromagnet is not electrically or not sufficiently energized, a mechanical delay device terminates the delay period and determines its end and thereby determines the termination of an exposure or photograph.

BRIEF DESCRIPTION OF THE DRAWINGS

Other objects and advantages of the electric shutter with a mechanical delay will appear from the following description of an example of the invention and the novel features will be particularly pointed out in the appended claims in conjunction with the specification and drawing in which:

DESCRIPTION OF THE PREFERRED EMBODIMENTS

Figure 1:
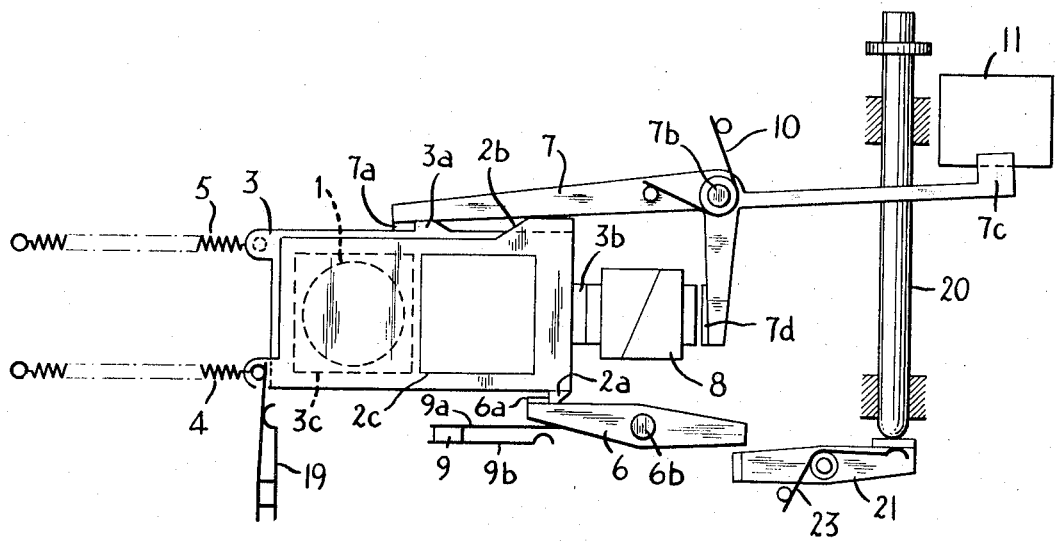
FIG. 1 is a diagrammatic front elevation view of an electric shutter provided with a mechanical delay device according to the invention and illustrates the shutter in a cocked condition.

As illustrated in FIG. 1 a camera shutter, according to the invention, is provided with an exposure or lens aperture 1 for taking exposures or photographs therethrough. The shutter has sector means for opening and closing the shutter or lens aperture. In the present embodiment the sector means are constructed as a first plate 2 that is illustrated closing the lens aperture 1 and a second plate 3 that is illustrated in a condition in which it is not closing the lens aperture. The two plates are disposed superposed and are reciprocably operable in two directions. The plates are biased in a direction toward the left of the drawing and operable in this direction or actuated toward the left by springs 4, 5 respectively. A locking hook or lever 6 pivotally mounted on a pivot 6b is provided with a hook portion 6a engaging a projection 2a of first plate 2 so that the plate is retained against the biasing force of the spring 4 and the shutter is in a cocked condition in the illustration in FIG. 1. The locking lever 6 is biased clockwise in a locking position by a spring contact 9a of a normally open switch 9 of an electric control circuit later described.

The second plate 3 is provided with an upper edge projection 3a engaged by a hook 7a of a timing lever 7 pivotally mounted on a pivot 7b. The second plate is provided with an iron piece or magnetizable piece 3b attracted by an electromagnet 8 of the electric control circuit hereinafter described. The iron piece 3b may engage the right side edge surface of the first plate 2. The timing lever 7 is biased in a counterclockwise direction by a spring 10 and is provided with an extension having a tab forming an indicator 7c that enters into the field of a view finder 11 when the shutter is cocked and is displaced therefrom when the shutter operates.

Figure 3:
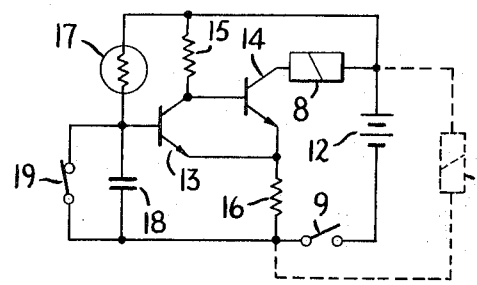
FIG. 3 is a schematic of the electric circuit of the shutter according to the invention.

The electric control circuit of the electric shutter is illustrated schematically in FIG. 3. The electromagnet 8 and the electric or power source switch 9, normally open, are connected to a battery or direct current source of power 12. A first and second transistors 13, 14 are connected as illustrated with respective resistors 15, 16. A photoconductor or photocell 17 is connected in the circuit for automatically sensing the light conditions or object of which the exposure is to be taken. A delay capacitor 18 is provided in the circuit and a normally closed timing switch 19 is connected across the capacitor as shown.

The shutter is illustrated in a cocked condition in FIG. 1. When the camera operator presses a camera release lever or button 20 as shown in FIG. 1, the release lever engages a pivoted lever 21 biased in a counterclockwise direction by a spring 23. This lever engages the locking lever 6 which is rotated in a counterclockwise direction so that springs contacts 9a, 9b of the switch 9 are made to contact and the power switch is, therefore, closed. The closing of the power switch energizes the electromagnet 8 so that it is excited by current flow through the second transistor 14. If the electric circuit is all right and the electric source of sufficient electric strength, normal conditions are established and the electromagnet 8 attracts and holds the iron piece 3b of the second plate against itself as well as attracting an iron piece 7d on a third arm of the timing lever 7. The attraction of the magnetizable element of the timing lever 7 rotates the lever in a clockwise direction so that its stop or hook 7a is disengaged from the upper edge projection 3 a of the second plate 3. The indicator 7c is displaced clear of the window of the view finder 11.

During this period of time, however, the locking hook 6 continues to be rotated in a clockwise direction so that it disengages from the projection 2a of the first plate 2 so that it is actuated in a direction toward the left by the actuating or biasing spring 4. The movement toward the left of the first plate 2 causes its exposure window 2c to be placed in registry with the lens aperture 1 and in registry with a window 3c of the other plate 3, so that an exposure may be taken on the film, not shown.

Figure 2:
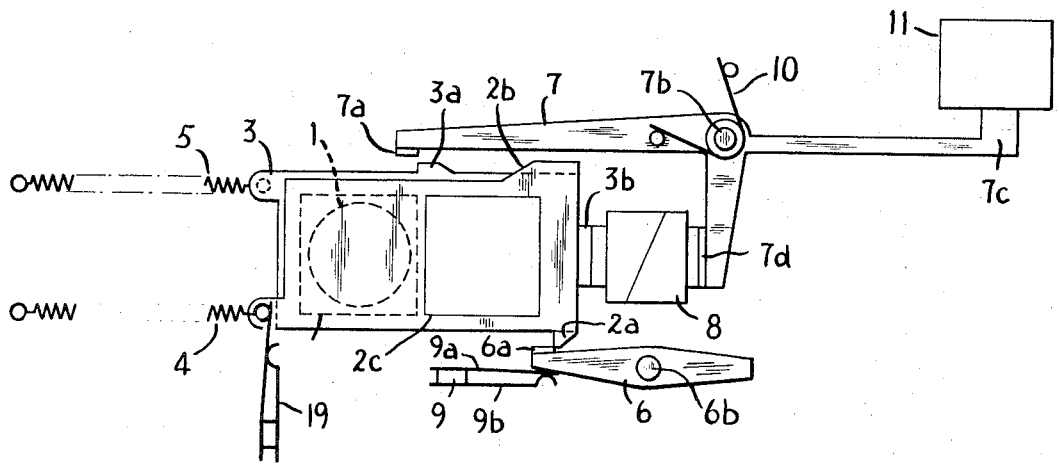
FIG. 2 is a diagrammatic front elevation view of the electric shutter in FIG. 1 and illustrates the shutter in a released condition.

The timing switch 19 is opened by mechanism, as shown in FIGS. 1 and 2, almost simultaneously with the start of the movement of the first plate 2 toward the left so that the capacitor 18 is charged through the photoconductor 17. When the charge is higher than the actuating voltage of the first transistor 13 this first transistor is rendered conductive while the second transistor 14 is rendered non-conductive resulting in interruption of current flow to the electromagnet 8. Since the holding or attracting force of electromagnet is then ineffective the second plate, having been released by the timing lever 7, is shifted toward the left by the force of its actuating or biasing spring 5 to close the lens aperture 1 and the exposure on the film is completed correctly.

According to the invention, even though the electric source is exhausted and even if the locking hook 6 is rotated in a counterclockwise direction from its position shown in FIG. 1 and the electric power source switch 9 is closed and the electromagnet 8 is not sufficiently excited so that it is unable to attract and hold the attracted piece 7d of the timing lever 7, a proper exposure can be taken. In the event that the electromagnet is not properly energized the timing lever 7 is not rotated in a clockwise direction so that its locking hook engages the edge projection 3a of the second plate 3 and the indicating part 7c remains in its position inside the field of the view finder 11. Under such conditions, when the lockin hook locking is rotated in a counterclockwise direction the engagement of the locking hook and the projection of the first plate 2 is released and the first plate 2 is shifted toward the left by the force of a spring 4 to initiate the exposure, as before described. Since the second plate is not being held by the electromagnet but remains engaged with the timing lever, the second plate is held in its position in which its exposure window is in registry with the exposure window of the first plate. However, the first plate is provided on its upper edge with an inclined camming surface 2b this inclined camming surface engages the hook 7a of the timing lever, as the first plate moves to the left, which extends into the path of the travelling first plate so that the locking engagement between the timing lever and the second plate 3 is disengaged mechanically and the second plate 3 is shifted to the left by its actuating spring 5 to finish the exposure. Thus, a mechanical delay device is built into the electric shutter that insures a proper exposure is taken even if the electromagnet 8 is not properly energized.

Figure 4:
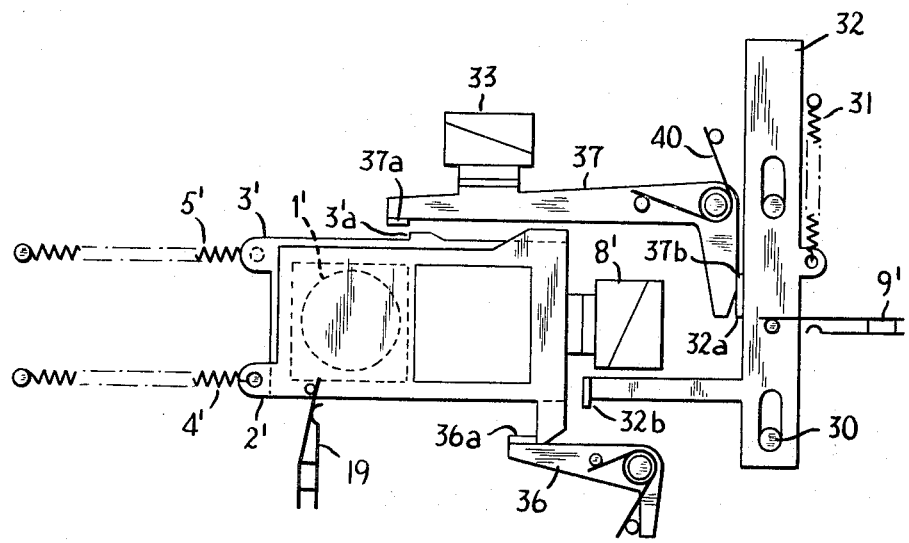
FIG. 4 is a diagrammatic front elevation view of a second embodiment of an electric shutter provided with a mechanical delay device according to the invention.

A second embodiment of an electric shutter provided with a mechanical delay device is illustrated in FIG. 4. In this figure the shutter has parts similar to those heretofore described and these are designated with reference numerals which are primed. The electric circuit described with respect to the embodiment in FIG. 3 is, in this embodiment, provided with an electromagnet 8' corresponding to the electromagnet 8 of the circuit illustrated in FIG. 3.

The second embodiment differs from the first embodiment described with respect to FIGS. 1 and 2. In this embodiment a camera release plate 32 is illustrated being guided for axial travel by pins 30 in respective longitudinal slots on the release plate. The plate is constantly biased in an upward direction by a biasing spring 31 and is thus biased in a direction for maintaining a power source switch 9' open. The latter switch corresponds to the power switch 9 heretofore described with respect to the first embodiment. A locking hook 36 is provided and is likewise pivotally mounted similarly to the locking hook 6 of the first embodiment. The locking hook is provided with a hook projection 36a that engages a projection on the first plate 2' cooperating with the second plate 3' for opening and closing the shutter in a manner similar to those heretofore described. The locking hook 6 holds the first plate in its cocked condition.

The shutter is provided with a pivotable timing lever 37 having a magnetizable element similarly to the timing lever 7 of the first embodiment which, in this instance, is attracted by an electromagnet 33 connected in the electrical circuit in an electrical arrangement illustrated in broken lines in FIG. 3 of the drawing. The timing lever has an arm having a side edge surface 37b engaging with a projection 32a of the release lever and a bevelled tip to allow reciprocable travel of the release plate.

The release plate is provided with a pin on a side surface thereof holding the spring contacts of the power switch 9' open as illustrated when the release plate is in a raised condition. When an exposure is to be taken the release plate 32 is manually depressed downwardly. As the release plate is depressed the power switch 9' is allowed to close and the electromagnets 8' and 33 are energized. As the release plate 32 continues in its movement downwardly its side projection 32a moves clear of the side surface 37b of the timing lever 37. If the timing electromagnet 33 is fully energized the timing lever 37 assumes the position shown in the drawing. However, if the holding force of the timing electromagnet 33 is insufficient or very small the timing lever 37 is held rotated in a counterclockwise direction by the force of a biasing spring 40 and its hook portion 37a remains engaged with the upper edge projection 3a of the second plate 3. As the release lever 32 is further moved downwardly a side projection 32b thereof engages the locking hook 36 and rotates it in a counterclockwise direction so that the first plate 2 is unlocked or released and its actuating spring 4' moves it toward the left. The subsequent of the second embodiment is the same as in the first embodiment. Thus, the mechanical delay device functions similarly to that before described.

In the second embodiment the second electromagnet 33 is provided separately from the first electromagnet 8'. The second embodiment control circuit may be constructed by using only a single electromagnet 8' as in the construction illustrated with respect to the first embodiment.

It will be noted that the various projections on the shutter plates or sectors are bevelled, for example a lower edge bevel on the projection 2a of the first plate, to allow the plates and the entire mechanism to be restored manually to a cocked condition manually in preparation for the successive exposures.

Figure 5:
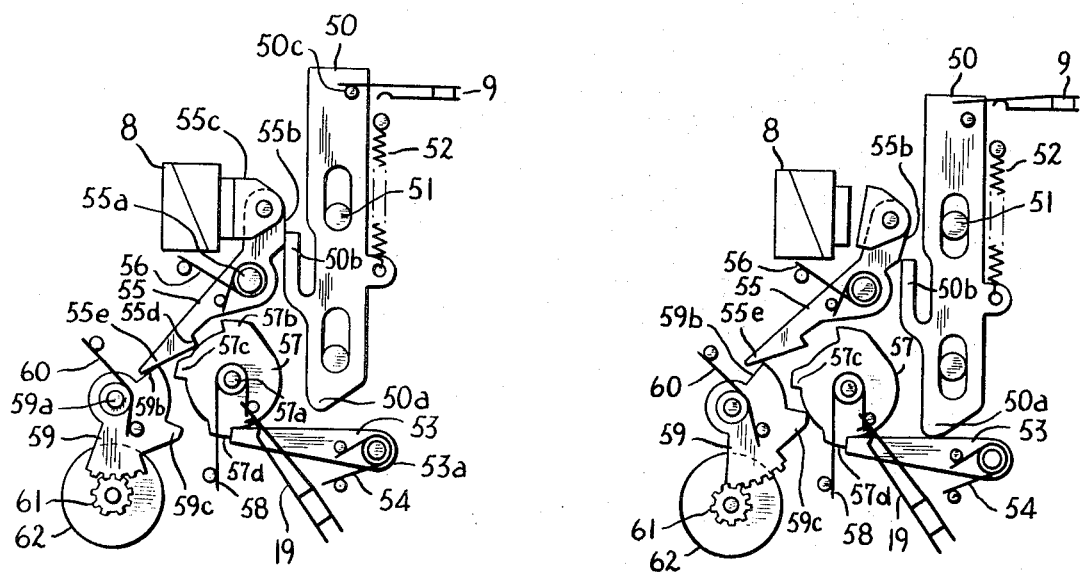
FIG. 5 is a diagrammatic elevation view of a third embodiment of a shutter provided with mechanical delay device according to the invention and illustrates the shutter in a cocked condition.
Figure 6:
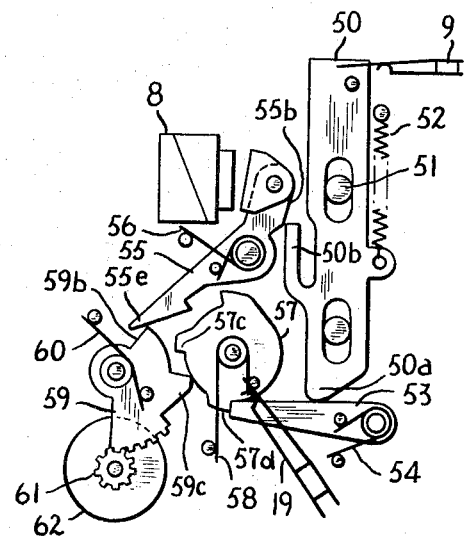
FIG. 6 is a diagrammatic elevation view of the shutter in FIG. 5 and illustrates the shutter in a released condition.

A third embdiment of an electric shutter provided with a mechanical timing device is illustrated in FIGS. 5 and 6. In this construction the circuitry is not illustrated and the electromagnet 8 and the switch 9 are the electromagnet and switch of the circuitry first described which is the circuit used in conjunction with this third embodiment of the electric shutter hereinafter described.

In the third embodiment a release plate 50 is movable axially upwardly and downward and is guided in its axial movement by pins 51 disposed in longitudinal slots in the release plate as illustrated. A spring 52 constantly biases the release plate to a rest position or raised position. The release plate is provided with a lower tip 50a which engages a locking lever 53 pivotally mounted on a pivot 53a and biased clockwise by a spring 54. The release plate is provided with an arm 50b engaging a side surface 55b of a control lever 55 pivotally mounted on a pivot 55a and which is biased in a clockwise direction by a spring 56.

Figure 7:
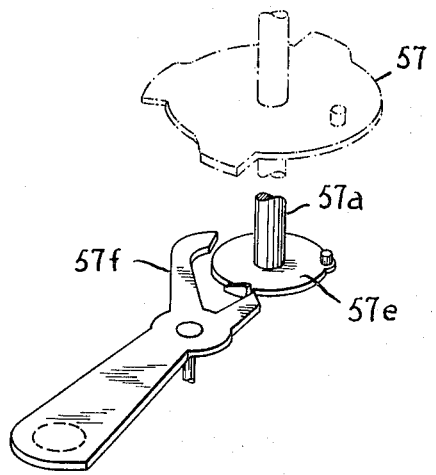
FIG. 7 is a fragmentary perspective view of a sector in the shutter of FIGS. 5 and 6.
Figure 7A:
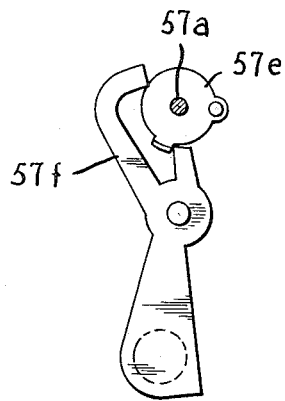
FIGS. 7A, 7B and 7C are diagrammatic illustrations of the mode of operation of the shutter sector in FIG. 7.
Figure 7B:
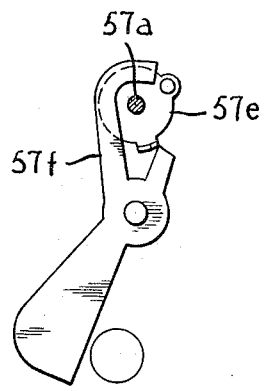
Figure 7C:
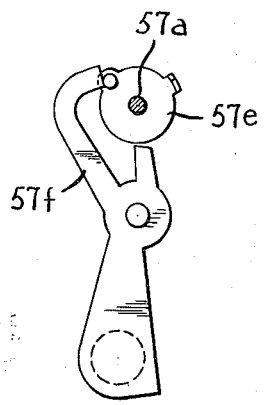

The release lever is provided with a pin 50c constantly maintaining the power switch 9 open and allowing it to be closed as the release button as hereinafter described. The control lever 55 is provided with an iron piece 55c attracted by the electromagnet 8 when it is energized and a hook portion 55d engaged by a peripheral projection 57b of a driving plate 57 pivotally mounted on a pivot 57a and biased counterclockwise by a biasing spring 58. The control lever 55 likewise has a surface 55e in contact with a peripheral projection 59b of a sector gear 59 rotatable on a pivot 59a and biased counterclockwise by a spring 60. The driving plate 57 is connected to a disk 57e which drives a sector 57f by a counterclockwise rotary action due to a spring 58 opens and closes the shutter aperture as shown in FIGS. 7A, 7B and 7C. The sector opens the shutter when the projection 7b engages a part of the control lever 55.

The sector gear 59 cooperates with a fly wheel 62 having a pinion 61 secured thereto and meshing with the sector gear. The sector gear has a second projection 59c for engaging a projection 57c of the driving plate 57 and in the cocked condition of the shutter, as shown in FIG. 5, it is located at a position in which it is not acting on the projection 57c of the driving plate. As before described the electric relay circuit shown in FIG. 3 is the circuit used with this embodiment.

When the release plate 50 is depressed and the shutter is in a cocked condition the electric power switch 9 is closed so that the electromagnet 8 is energized. As the release plate 50 is moved further downwardly the side arm 50b thereof is disengaged from the side surface 55b of the control lever 55. At this time if the electromagnet 8 is fully energized or excited the control lever 55 does not act but if the electromagnet is not sufficiently excited the control lever 55 is rotated in a clockwise direction to assume a position illustrated in FIG. 6.

In the event that the electromagnet 8 is sufficiently excited, because the battery is sufficiently strong or there is nothing deficient with the electrical circuit, the locking hook 53 engaged by the release lever and is caused to rotate in a counterclockwise direction by the downward movement of the release plate 55. The driving plate 57 is released from the locking hook 53 and rotated counterclockwise by the force of its actuating spring 58 to open this the sector which opens the lens aperture. When the sector is fully open the driving plate 57 projection 57b engages the corresponding part 55d of the control lever 55 keeping the sector in its shutter opening condition. When the electromagnet is deenergized by the automatic action of the electric delay circuit the control lever 55 is rotated clockwise by the force of its spring 56 and the driving plate 57 rotates counterclockwise to actuate the sector to a closing position closing the lens aperture. The sector gear 59 is then rotated in a counterclockwise direction but since the rotation velocity of the driving plate is much larger than that of the sector gear 59 the driving plate 57 is not subjected to any action of the sector gear 59.

In the event that the electromagnet 8 is not sufficiently energized, for example if the battery is exhausted, the mechanism assumes the positions illustrated in FIG. 6 by the downward movement of the release plate 50 and as the release plate moves further downwardly the locking hook 53 is rotated in a counterclockwise direction and the driving plate 57 is released from the locking hook 53 to rotate counterclockwise resulting in opening the shutter sector. When the sector is fully opened the driving plate projection 57c engages the sector gear projection 59c to make the sector gear 59 rotate in a clockwise direction. After that the driving plate 57 rotates clockwise further and closes the sector.

Those skilled in the art will understand that the components such as the engagement of the projection 59c of the sector 59 and the projection 57c of the driving plate 57 are so arranged so that the engagement is manually adjustable it is possible to make adjustments of the time exposure.

As can be seen the various embodiments of the electric shutter provided with a mechanical delay device allow taking of photographs even though the electrical power source is exhausted or in the event there is a fault in the electric circuit and the camera operator is not aware of the exhaustion of the battery or any fault in the circuit.

What I claim and desire to be secured by Letters Patent is:

1. In an electric shutter having a lens aperture, sector means operable to a position opening the lens aperture and a position closing the lens aperture, operating means to operate the sector means to the position opening the lens aperture and a position closing the lens aperture, control means to render the operating means effective to operate the sector means to open the lens aperture including automatic timing means to determine a delay period after which the sector means closes the shutter lens aperture, said timing means comprising an electromagnet normally controlling said delay period, and including mechanical delay means cooperative with said electromagnet for effecting a delayed closing of the shutter lens aperture only when the electromagnet is insufficiently energized or completely deenergized, said mechanical delay means comprising an L-shaped lever a first end of which engages a detent on the shutter closing sector for retaining said closing sector in the open position and a second end of which is adjacent said electromagnet for engagement with said electromagnet to release said closing sector upon energization of said electromagnet; and a cam shaped projection on the opening shutter sector for releasing said first end in the event said electromagnet is not sufficiently energized.

2. In a camera electric shutter according to claim 1, in which said electromagnet energized means comprises means to determine the end of said delay period, and in which said mechanical delay means includes means determining the end of a constant delay period only when said electromagnet energized means is deenergized or insufficiently energized.

* * * * *